United States Patent Office 3,387,401
Patented June 11, 1968

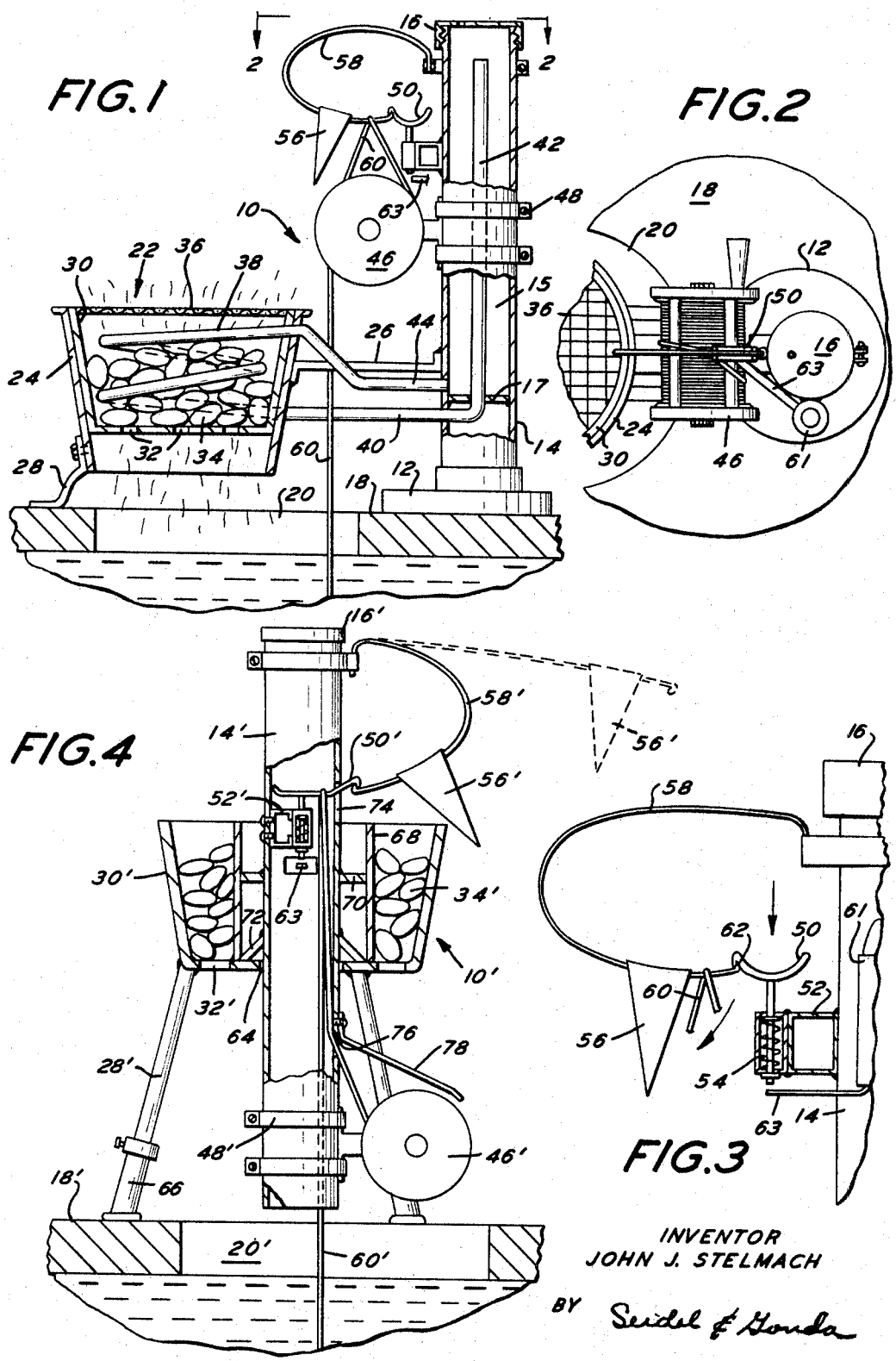

3,387,401
FISHING DEVICE
John J. Stelmach, 1621 Dounton St.,
Philadelphia, Pa. 19140
Filed Oct. 14, 1965, Ser. No. 495,803
5 Claims. (Cl. 43—17)

ABSTRACT OF THE DISCLOSURE

A fishing device including a means for directing heat into a hole chopped in ice so as to prevent the same from freezing over. Heat is also directed to a fishing reel so that the reel will not freeze. An indicator responsive to a fish biting on the line may be utilized so that a fisherman may be at a remote location since the device does not require his constant attention.

---

This invention relates to a fishing device, and more particularly, to a fishing device which is designed particularly for use in inclement weather.

When fishing through a hole cut in ice on a body of water, the hole freezes over within a short period of time. Hence, it has been necessary for fishermen to constantly break up the ice in the hole to prevent the same from freezing over. Also, the reel frequently jams due to freezing conditions to which the reel is exposed.

The fishing device of the present invention includes a means for directing heat into the hole chopped in the ice so as to prevent the same from freezing over. Also, a means is provided for directing a portion of the heat to the reel so that the reel will not freeze. In such an environment, it is possible to incorporate an indicator responsive to fish biting on a line. Many indicators have been proposed heretofore but the same have not been acceptable or practical in view of the fact that either the hole or the reel is frozen and therefore unable to actuate an indicator.

It is an object of the present invention to provide a fishing device for use in inclement freezing weather.

It is another object of the present invention to provide a fishing device for fishing through a hole in ice.

It is another object of the present invention to provide a fishing device for fishing through a hole in ice constructed in a manner so that the reel and the hole will not freeze.

It is another object of the present invention to provide a heated fishing device for fishing through a hole in ice and having an indicator associated therewith to indicate that a fish is biting on the line.

Other objects will appear hereinafter.

For the purpose of illustrating the invention, there are shown in the drawings forms which are presently preferred; it being understood, however, that this invention is not limited to the precise arrangements and instrumentalities shown.

FIGURE 1 is a side elevation view partly in section illustrating the fishing device of the present invention.

FIGURE 2 is a view taken along the line 2—2 in FIGURE 1.

FIGURE 3 is an enlarged detailed elevation view, partly in section, of the upper end of the structure illustrated in FIGURE 1.

FIGURE 4 is a longitudinal sectional view of a fishing device in accordance with another embodiment of the present invention.

Referring to the drawing in detail, wherein like numerals indicate like elements, there is shown in FIGURE 1 a fishing device designated generally as 10 for fishing through a hole in ice.

The device 10 includes a base 12 having an upright support member 14. The member 14 may have a tubular device attached thereto. Preferably, a separate tubular device is eliminated by making the member 14 hollow so as to have a chamber 15 therein between a bottom wall 17 and a cap 16.

The base 12 is adapted to be supported on ice 18 adjacent a hole 20. A heater means designated generally as 22 is supported above the hole 20 from the support member 14 by means of a bracket arm 26. Means 22 may have a leg 28 which is adapted to rest on the ice 18.

The heater means 22 includes a tapered tubular support shell 24 which is connected directly to the leg 28 and bracket arm 26. A tapered cup-shaped pot 30 is removably supported within the shell 24. The depth of the pot 30 in a vertical direction is less than the depth of the shell 24. The pot 30 is provided with a bottom wall having a plurality of perforations 32 therein. The shell 24 lacks a bottom wall.

Combustible articles such as charcoal 34 are supported within the pot 30 and adapted to be consumed therein. The heat generated by the burning of the charcoal 34 radiates downwardly into the hole 20 and prevents the water in the hole 20 from freezing. If desired, a screen 36 may be provided over the charcoal within the pot 30. The upper edge of the shell 24 may be provided with a radially outwardly directed flange so as to facilitate supporting other devices thereon such as a coffee pot.

A hollow copper coil 38 is disposed within the pot 30 in intimate contact with the charcoal 34. Coil 38 has its ends extending through apertures in the pot 30 and shell 24. One end of coil 38 is connected to a conduit 40. Conduit 40 extends through a hole in support 14 and a hole in wall 17 thereby terminating in an upwardly directed leg 42.

Leg 42 is of sufficient length so that its free end is adjacent but spaced from the cap 16. Leg 42 is concentrically disposed within the chamber 15. The other end of coil 38 is connected to a conduit 44. Conduit 44 is connected to chamber 15 adjacent to but above the wall 17. By removing cap 16, it is possible to introduce water into chamber 15 and at the same time completely fill the leg 42, conduits 40 and 44, and coil 38.

A reel 46 is removably and adjustably connected to the support member 14 by means of brackets 48. A yoke member 50, adapted to support a fishing pole, is reciprocally supported by the member 14 above the reel 46. As shown more clearly in FIGURE 3, the yoke member 52 is mounted for reciprocation in a direction parallel to the longitudinal axis of member 14. A spring 54 biases the yoke member 50 to its uppermost position out of contact with contact member 63.

The yoke member 50 and spring 54 are supported by a tubular housing at one end of a bracket 52. The other end of bracket 52 is fixedly secured to the support member 14 in any convenient manner such as by welding, adjustable coupling, etc. A battery operated flashlight 61 may be provided on member 14 to indicate that a fish is biting on the hook connected to the line 60.

As illustrated, the visual indicator may include a flag 56 secured adjacent to one end of a flexible reed 58. Reed 58 is a metal member having a bent tip received within a notch 62 on the lower surface of yoke member 50. The other end of reed 58 is secured by a bracket to the upper end of support member 14 below the cap 16. Line 60 is wound on the reel 46 and extends over the reed 58 before passing through the hole 20 in the ice 18.

When the device 10 is positioned on the ice 18 adjacent the hole 20, and the charcoal 34 is burning, the radiant heat from the charcoal prevents the hole 20 from freezing. The heat from the charcoal 34 is also transmitted to the reel 46 by way of the liquid circulation system. The liquid circulation system includes a chamber 15, leg 42, conduit 40, coil 38, and conduit 44. The water in the system is continuously circulated to prevent the reel from freezing and to prevent the yoke member 50 from freezing. The circulation of the water is predicated on natural convection currents which cause hot water to rise to the top of chamber 15 and then pass downwardy through the leg 42. The heat transmitted to base 12 or leg 28 is insufficient to melt ice 18.

When a fish bites on line 60 and a pole is supported by member 50, the yoke member 50 is moved downwardly against the bias of spring 54. As member 50 moves downwardly, the bent tip on reed 58 will no longer be retained within the notch 62. If no pole is used, the tension on line 60 pulls the bent tip of reed 58 out of notch 62. Hence, the reed 58 in either case will straighten out thereby positioning the flag 56 is a location remote from the support member 14 thereby indicating that a fish is or was biting on line 60. Hence, the fisherman need not continuously hold the reel or the line 60 and may have his hands in his pockets or warming the same over the heater means 22. In fact, the fisherman may be at a remote location since the device 10 does not require his constant attention. When member 50 moves down to engage member 63, a battery operated circuit through member 14 lights up flash light 61.

In FIGURE 4, there is illustrated another embodiment of the present invention designated generally as 10'. The device 10' is identical with the device 10 except as will be described hereinafter. Hence, corresponding elements are provided with corresponding primed numerals.

In fishing device 10', the pot 30' is provided with a plurality of legs 28'. Preferably three such legs are provided. The legs 28' are each provided with an adjustable extension 66 to facilitate raising and lowering the pot 30' and the reel 46 with respect to the hole 20' in the ice 18'.

The tubular support member 14' is centrally disposed with respect to the pot 30' and extends through an aperture 64 in the bottom walls of the pot 30'. A retainer wall 68 surrounds the support member 14' and spaces the same from the charcoal 34'. The support member 14' is provided on its outer periphery with a radially outwardly directed spacer 70 adapted to space the same from the inner periphery of retainer wall 68. The outer periphery of member 14' is also provided with legs 72 adapted to rest on the bottom wall of the pot 30'.

The yoke member 50' is supported within the member 14' by bracket 52'. A portion of the yoke member 50' extends through an aperture 74 in the member 14' so as to facilitate connection with the bent tip on the reed 58'. The line 60' extends from the reel 46' through an aperture 76 in the support member 14', upwardly through the member 14', over the yoke member 50', downwardly through the open end of the member 14' and then through the hole 20' in the ice 18'.

In addition to the radiant heat from the charcoal 34', heat may be introduced into the hole 20' to prevent freezing of the same by means of the lower end of support member 14'. In this regard, the extensions 66 on the legs 28' are adjustable. If desired, a heat shield 78 may be supported on the outer periphery of member 14' between the reel 46' and the bottom wall of pot 30' to prevent undue heat from being directed to the line on the reel 46'. Heat to prevent the reel 46' and yoke member 50' from freezing is transmitted thereto from the charcoal 34' by conduction through member 14'. Heat is conducted to the member 14' by way of the spacer 70 contacting the retainer wall 68 and by the legs 72 contacting the bottom wall of the pot 30'. Otherwise, the device 10' is identical with the device 10.

Base 12 may be replaced by a C-clamp for attaching the fishing device to a side of a boat if it is desired to use the device in other environments. Also, a sharp prong similar to an ice pick may be substituted for base 12 if it is desired to use the device on shore. The prong would be used to position the device and would be forced into the ground.

The present invention may be embodied in other specific forms without departing from the spirit or essential attributes thereof and, accordingly, reference should be made to the appended claims, rather than to the foregoing specification as indicating the scope of the invention.

I claim:

1. A fishing device comprising an upright support member, a reel on said support member, a heater means, means for transmitting heat from said heater means to said reel, said heater means including a pot having a perforated bottom wall to facilitate radiation of heat downwardly, and indicator means supported by said member and connected thereto in a manner which will permit transmission of heat from said member to said indicator means, said indicator means having an element cooperating with a line on said reel, and means for supporting the heater means and member as a unit adjacent a hole in ice.

2. A fishing device comprising a support member, a said heater means including a pot for supporting articles to be burned, and said pot having perforations in its bottom wall to facilitate radiating heat downwardly toward a hole in ice.

3. A device in accordance with claim 2 wherein said pot is connected to said support member for support thereby.

4. A fishing device comprising a support member, a reel on said support member, a heater means, means for transmitting heat from said heater means through said member to said reel to prevent said reel from freezing, and said support member extending through said heater means.

5. A fishing device comprising a support member, a reel on said support member, a heater means, means for transmitting heat from said heater means through said member to said reel to prevent said reel from freezing, said heater means including a pot, said pot being adapted to support articles to be burned, a coil within said pot, the ends of said coil being in communication with a chamber supported by said support member, one of the ends of the said coil being in communication with said chamber at an elevation higher than the other end, and said chamber and coil being adapted to be filled with a liquid.

References Cited
UNITED STATES PATENTS

| | | | |
|---|---|---|---|
| 1,253,746 | 1/1918 | Teeling | 43—17 |
| 2,618,091 | 11/1952 | Sheraski | 43—17 |
| 2,883,784 | 4/1959 | Obernolte | 43—4 |
| 2,990,829 | 7/1961 | McDonough et al. | |
| 3,025,852 | 3/1962 | Quilling. | |
| 3,030,122 | 4/1962 | Madera | 43—4 X |
| 3,230,655 | 1/1966 | Nomsen | 43—17 |

SAMUEL KOREN, *Primary Examiner.*

D. J. LEACH, *Assistant Examiner.*